April 7, 1970     T. R. MILES     3,504,715

PORTABLE SAWMILL

Filed June 27, 1967     7 Sheets-Sheet 1

THOMAS R. MILES
INVENTOR

BY
BUCKHORN, BLORE, KLARQUIST & SPARKMAN
ATTORNEYS

April 7, 1970  T. R. MILES  3,504,715
PORTABLE SAWMILL
Filed June 27, 1967  7 Sheets-Sheet 2
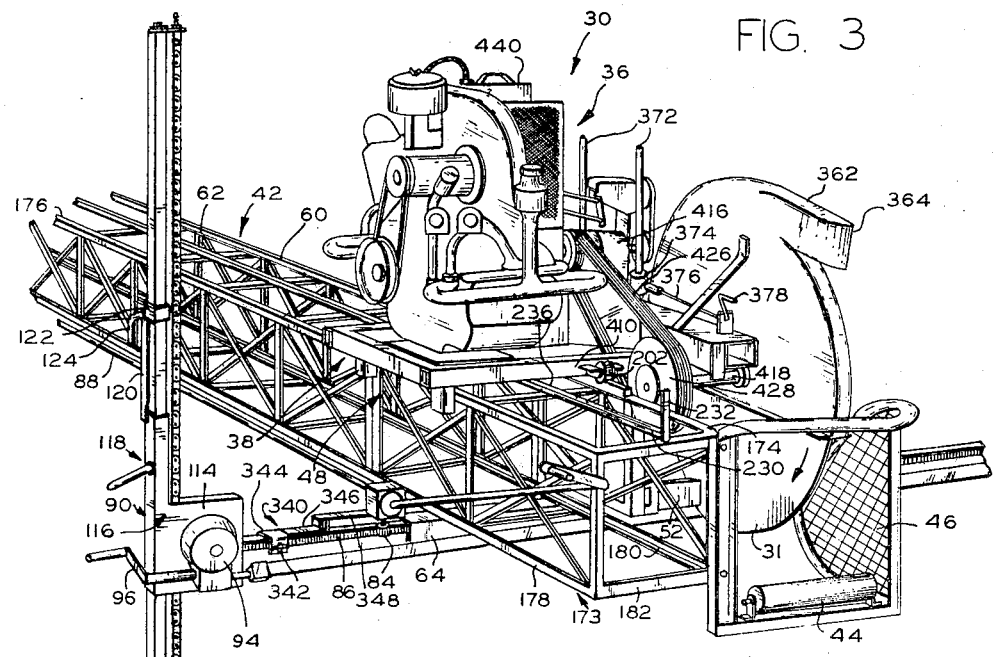
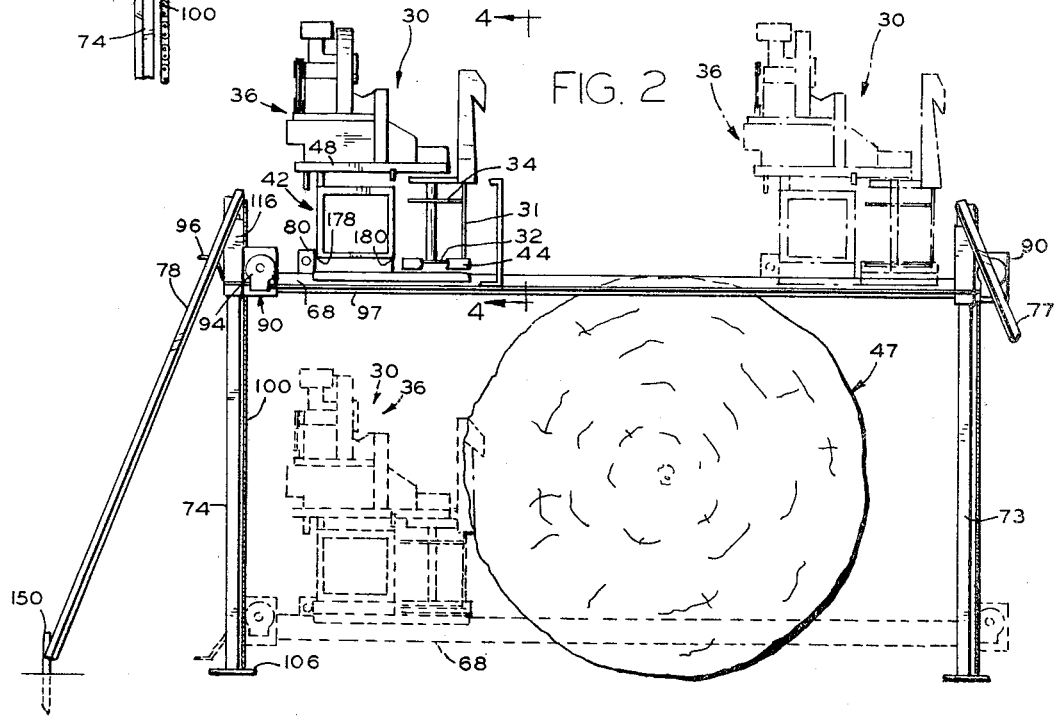
THOMAS R. MILES
INVENTOR
BY
BUCKHORN, BLORE, KLARQUIST & SPARKMAN
ATTORNEYS April 7, 1970 T. R. MILES 3,504,715
PORTABLE SAWMILL Filed June 27, 1967 7 Sheets-Sheet 3

THOMAS R. MILES
INVENTOR
BY
BUCKHORN, BLORE, KLARQUIST & SPARKMAN
ATTORNEYS

April 7, 1970       T. R. MILES       3,504,715
PORTABLE SAWMILL
Filed June 27, 1967       7 Sheets-Sheet 4
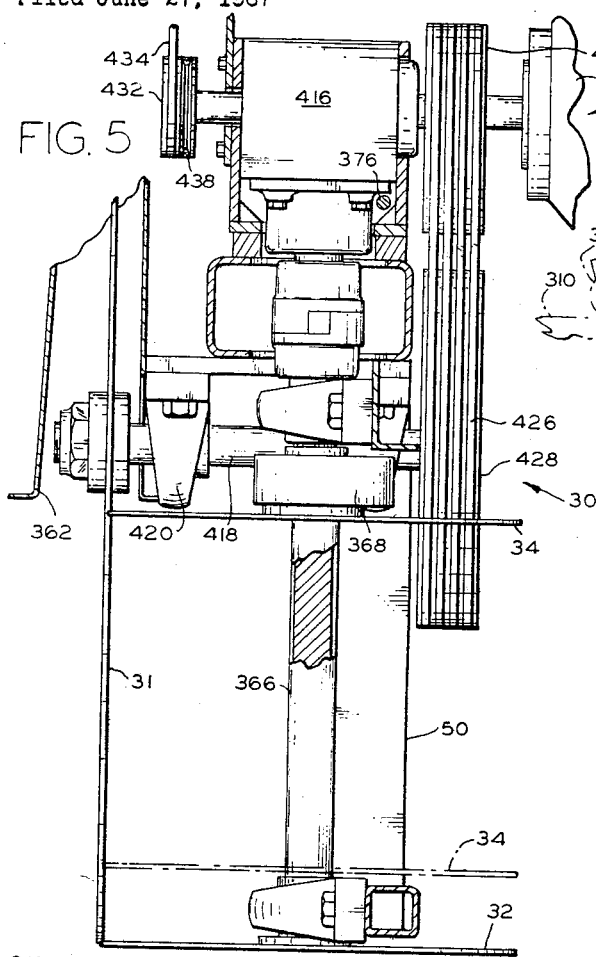
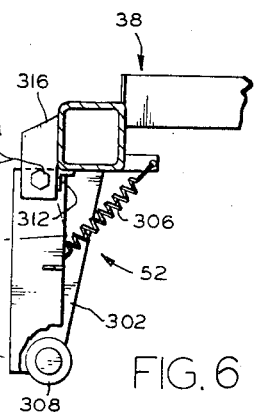
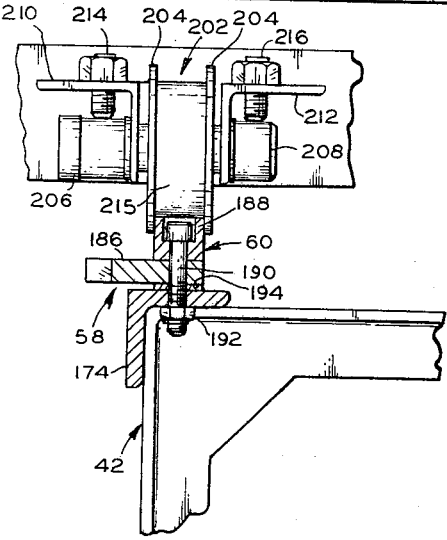
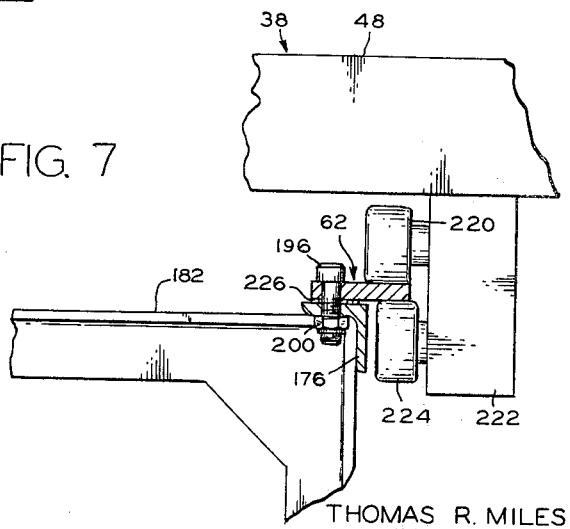
THOMAS R. MILES
INVENTOR
BY
BUCKHORN, BLORE, KLARQUIST & SPARKMAN
ATTORNEYS April 7, 1970  T. R. MILES  3,504,715
PORTABLE SAWMILL
Filed June 27, 1967  7 Sheets-Sheet 5
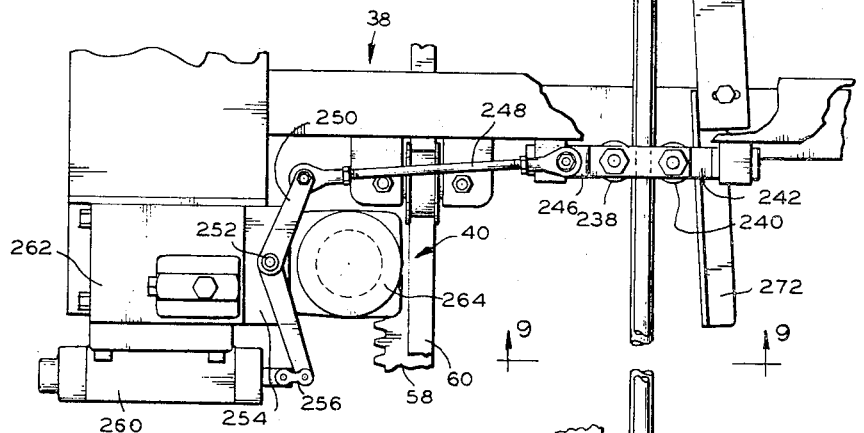
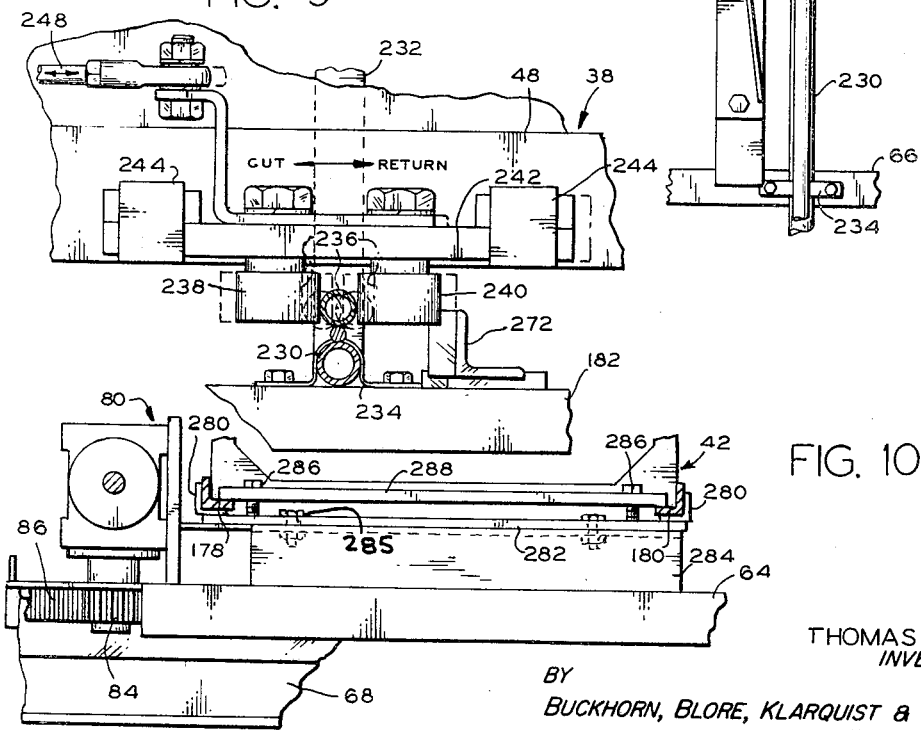
THOMAS R. MILES
INVENTOR
BY
BUCKHORN, BLORE, KLARQUIST & SPARKMAN
ATTORNEYS

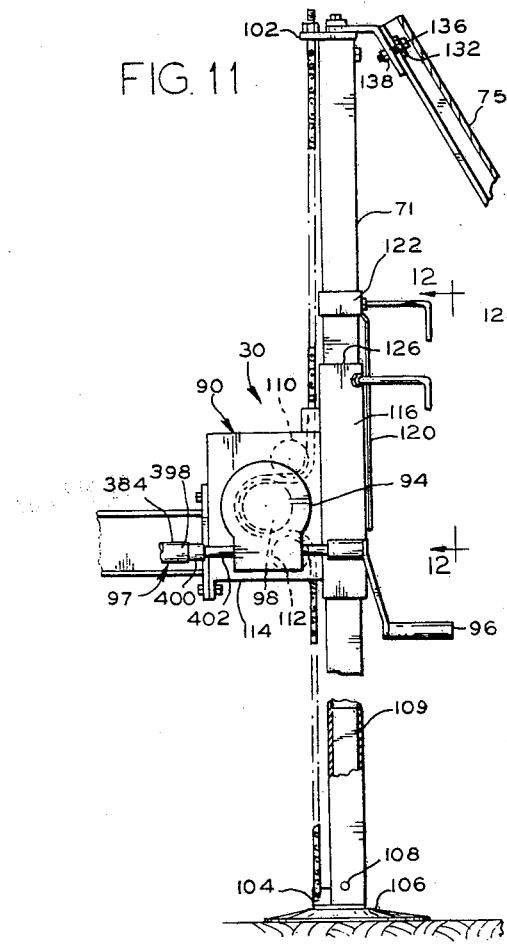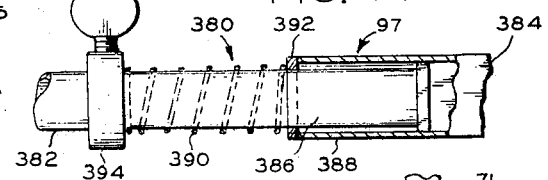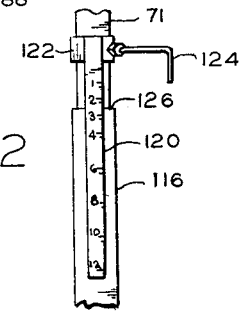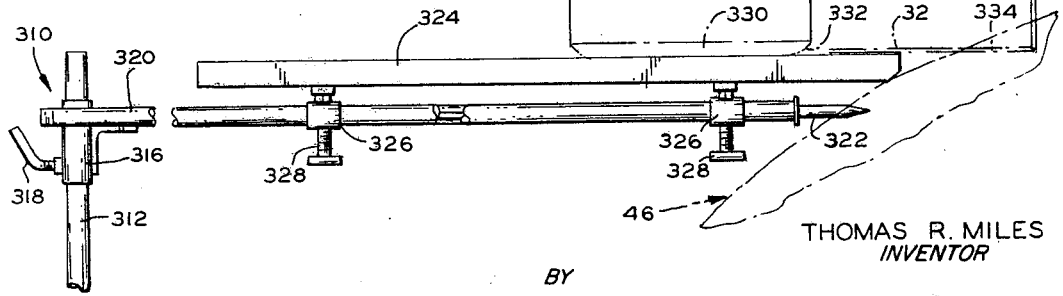

April 7, 1970     T. R. MILES     3,504,715
PORTABLE SAWMILL
Filed June 27, 1967     7 Sheets-Sheet 7
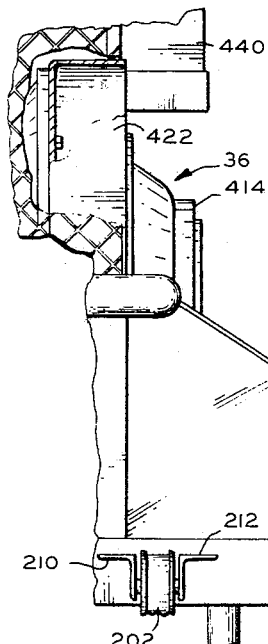
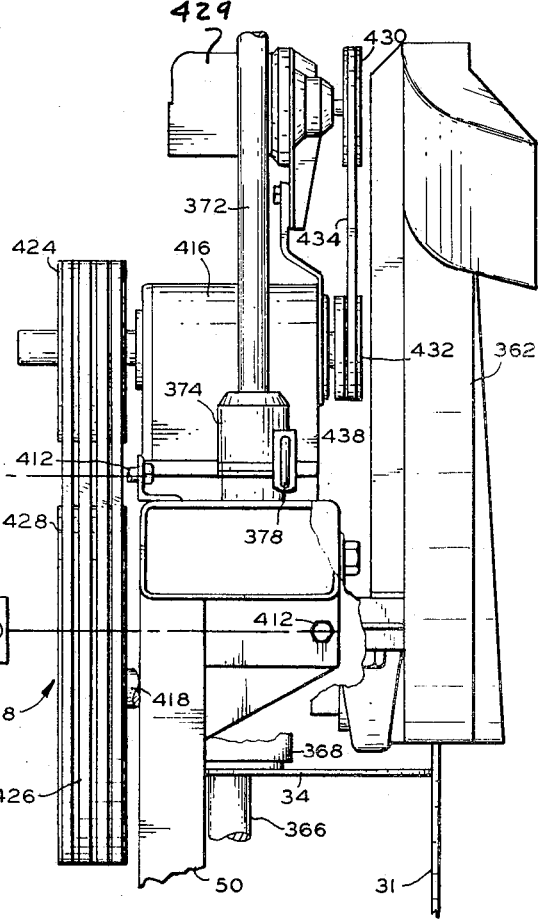
FIG. 15
THOMAS R. MILES
*INVENTOR*
BY
BUCKHORN, BLORE, KLARQUIST & SPARKMAN
*ATTORNEYS*

United States Patent Office 3,504,715
Patented Apr. 7, 1970

3,504,715
PORTABLE SAWMILL
Thomas R. Miles, Portland, Oreg., assignor to International Enterprises of America, Inc., Portland, Oreg., a corporation of Oregon
Filed June 27, 1967, Ser. No. 649,315
Int. Cl. B27b 5/00
U.S. Cl. 143—33   36 Claims

ABSTRACT OF THE DISCLOSURE

A carriage movable along a track carries an engine, a lower horizontal saw, an adjustable upper horizontal saw and a vertical saw. The track is trussed, includes a plurality of sections dowelled together, and is extensible by adding sections. A pair of crossfeed rails support the track and have racks engaged by pinions carried by the tracks and driven by worm gear crossfeed drives interlocked by an extensible quick-connecting shaft. The crossfeed drives can be driven selectively either forwardly or in reverse, and can be backed off slightly after each cut to provide clearance for the vertical saw as the carriage is returned to the starting position. A cross-feed gauge on the rail at the offbear end where the operator is stationed can be adjusted along the rail by the operator during the cutting stroke of the carriage, and serves to stop the crossfeed at the desired point after the carriage has been returned. The rails are carried by slides movable along easily assembled and dis-assembled corner end stands secured by corner braces. Each of the two slides at one end are movable together up or down the stands by vertical travel worm gear drives carried by the slides and driving sprockets meshing with chains stretched between and secured to the tops and bottoms of the stands. The two vertical travel worm gear drives at each end of the mill are interlocked by a quick-connecting shaft. Uniform vertical travel of each interlocked pair of worm gear vertical travel drives is effected by cranking only one of the drives, and a vertical travel gauge indicates the extent of travel and has marks thereon to indicate board width and compensation for one or two kerf widths. The carriage includes a main frame carrying the engine and a detachable attachment frame carrying the saws, the power transmitting elements from the engine to the saws, a hydraulic pump and a hydraulic motor which drives a pinion meshing with a rack fixed to the track. The rack includes a plurality of rack sections which are stretched if necessary to make them of the same lengths as the track sections so that the end teeth of all the rack sections start at the same point. The rack sections and guide bar sections are shimmed to the track sections, and grooved rollers of the main frame of the carriage run on the guide bar sections. Stabilizing rail sections shimmed to the track sections are bracketed by a pair of rollers on horizontal axes on the main frame of the carriage. The engine is end-mounted on a vertical bracket of the main frame of the carriage. The engine drives through a flywheel coupling the hydraulic pump, a V-belt drive driving the vertical saw and a right-angle drive driving the horizontal saws, all of which are mounted with the saw arbors on the attachment frame which can be easily removed from the main frame and replaced by a second attachment frame carrying a chain saw or other power tool to be driven by the engine and moved by the carriage. For sawing long logs, a sled-like slide is mounted on the bottom of the central portion of the track and is initially supported by a vertically adjustable auxiliary crossfeed guide supported by a stand and dogs driven into a portion of the log below the level at which boards are to be initially cut. After the initial boards have been cut, the slide and the track are moved over the newly sawed horizontal surface which supports the slide to prevent sag in the track.

DESCRIPTION

This invention relates to an improved portable sawmill, and more particularly to an easily assembled and disassembled portable sawmill.

Small portable sawmills which can be disassembled and carried manually have been known in the past. However, such sawmills have not been easily controlled, have not been easily operated, and have not been able to cut precise, semi-finished surfaces at high speed and have been difficult to maintain. The prior art sawmills also have not been easily convertible from vertical and horizontal rotary saws to chain saw or other power tool operation, and have involved substantial effort to remove sawed boards therefrom.

An object of the invention is to provide a new and improved portable sawmill.

Another object of the invention is to provide an easily assembled and dis-assembled portable sawmill.

A further object of the invention is to provide a portable sawmill having a power feed controlled at all times by an operator at one end of the mill.

Another object of the invention is to provide a portable sawmill having an extensible track supporting a saw carriage and supported by crosshead slides having reversible drives interlocked by an extensible shaft extending along the track.

Another object of the invention is to provide a portable sawmill having crossfeed rails supported by interlocked pairs of adjustable, vertical slides mounted on stands braced so as to obviate dogging to a log to be sawed.

Another object of the invention is to provide a crossfeed control gauge adapted to stop crossfeed of a saw unit and track in position to saw a board of a predetermined width and resettable by an operator while a board is being sawed to position the gauge for the next board to be sawed.

Another object of the invention is to provide a portable sawmill having a pair of edger saws with one of the edger saws having a supporting collar movable by a pair of interlocked worm type drives which prevent movement of that saw except when the drives are intensionally actuated.

A further object of the invention is to provide a portable sawmill having at the offbear end thereof an offbear roller adapted to raise somewhat cants or boards pushed off a log from which they are sawed.

Another object of the invention is to provide a portable sawmill having a saw carriage movable along a track and a cage-like guard positioned at the offbear end of the track at which is located an operator.

Another object of the invention is to provide a portable sawmill having a carriage including a main frame movable along a track and carrying a prime mover and also having detachably secured thereto either a frame carrying vertical and horizontal rotary saws and a hydraulic carriage drive or a frame carrying a chain saw and/or a planer to be driven by a prime mover.

Another object of the invention is to provide a portable sawmill having a track supported by crossheads at its ends and a central auxiliary support supporting a slidelike slide on the bottom of the central portion of the track to prevent sag in the track until the slide moves onto a sawed, horizontal top surface of a log at which time the slide engages the top surface of the log to prevent sag in the track.

Another object of the invention is to provide a portable sawmill having a track including a plurality of support sections dowelled and bolted together, and having a plurality of guide sections shimmed to the support sections so as to be straight.

Another object of the invention is to provide a portable sawmill having a track for a carriage in which the track includes a plurality of longitudinal members fixed to a plurality of rigid, stamped, cup-shaped crosspieces with crossed strut-like members interconnecting the crosspieces.

Another object of the invention is to provide a portable sawmill having a carriage movable along a track and carrying a forked control slide movable along an actuating rod mounted on the track which can be swung by an operator at one end of the track to actuate the control slide to set a drive on the carriage for neutral, forward or reverse operation, actuating wedges being provided at the ends of the track for shifting the control slide to neutral as the carriage arrives at either end.

The invention provides a portable sawmill which may be easily assembled and disassembled into manually portable units and includes a track supported by crosshead slides movable along parallel crossfeed rails. The track preferably is made up of a plurality of sections bolted and dowelled together with each section including longitudinal corner angles welded to flanged, cup-like cross frames with crossed bracing, and supporting a guide bar and a rack section shimmed and bolted to one side of its top and a stabilizing plate shimmed and bolted to the other side of its top. For longer logs, additional sections may be incorporated into the track. A carriage carrying a prime mover and a powered tool is movable along the track preferably by a pinion driven by a hydraulic drive on the carriage driven by the prime mover, and has grooved rollers riding on the guide bar and a pair of rollers engaging the top and bottom of the stabilizing plate. The saw carriage preferably is split with a main frame carrying the prime mover and supported by the rollers and an attachment frame supporting the hydraulic drive and rotary, vertical and horizontal saws or a chain saw and/or a planer. There preferably are upper and lower horizontal saws with the lower saw being end mounted and the upper saw adjustable along the same arbor as the lower saw and movable by a plate adjustable vertically by a pair of coupled, self-locking worm gear drives. The carriage preferably carries a forked slide operable by an eccentric control rod structure extending along the track and operable at the offbear end of the track to actuate the carriage longitudinal feed drive to forward, reverse or neutral. Wedges near the ends of the track actuate the slide to neutral. The crossfeed slides are driven selectively in either direction by self-locking worm gears interconnected by an extensible shaft parallel to the track, and, with some lost motion in the shaft, the offbear slide may be backed off after a cut has been made to enable the vertical saw to clear the adjacent vertical wall of the log when the carriage is returned to its offbear position. A cage-like guard on the offbear end of the track prevents accidental access to the saws, and an offbear roller is provided at the offbear end of the track to lift slightly a board being fed out of the mill by a ratchet-like arm carried by the carriage. A hook-like gauge may be set on the crossfeed rail at the offbear end while one cut is being made and stops the crossfeed at the desired point for the next cut. The two crossfeed rails preferably are mounted independently by pairs of worm gear drives adjustably vertically on corner stands and connected together by quick-disconnect shafts. Braces on the four stands make dogging of the log unnecessary. One stand at each end has an adjustable gauge thereon having marks compensating for either one or two horizontal kerfs. When the track is long, an auxiliary crossfeed support may be used which includes a slide-like slide on the bottom of the central portion of the track which, at the start of each series of cuts leaving a planar horizontal top surface of the log, rests on a rail supported for vertical adjustment at one end on a stand and supported at its other end by dogs driven into the side of the log. As the carriage cuts into the log, the slide moves onto the top surface to continue to prevent sag in the track.

A complete understanding of the invention may be obtained from the following detailed description of a portable sawmill forming a specific embodiment thereof, when read in conjunction with the appended drawings, in which:

FIG. 2 is an end view of the sawmill of FIG. 1;

FIG. 3 is a fragmentary, perspective view of the sawmill of FIG. 1;

FIG. 5 is an enlarged vertical sectional view taken along line 5—5 of FIG. 4;

FIG. 6 is an enlarged horizontal sectional view taken along line 6—6 of FIG. 4;

FIG. 7 is an enlarged vertical sectional view taken along line 7—7 of FIG. 4;

FIG. 8 is an enlarged fragmentary top plan view of a portion of the sawmill of FIG. 1;

FIG. 9 is an enlarged vertical sectional view taken along line 9—9 of FIG. 8;

FIG. 10 is an enlarged vertical sectional view taken along line 10—10 of FIG. 4;

FIG. 11 is an enlarged fragmentary rear elevation view taken along line 11—11 of FIG. 1;

FIG. 12 is an enlarged fragmentary side elevation view taken along line 12—12 of FIG. 11;

FIG. 13 is an enlarged fragmentary side elevation view taken along line 13—13 of FIG. 1;

FIG. 14 is an enlarged fragmentary side elevation view taken along line 14—14 of FIG. 1; and FIG. 15 is an enlarged exploded view of a saw unit of the sawmill of FIG. 1.

Figure 1:
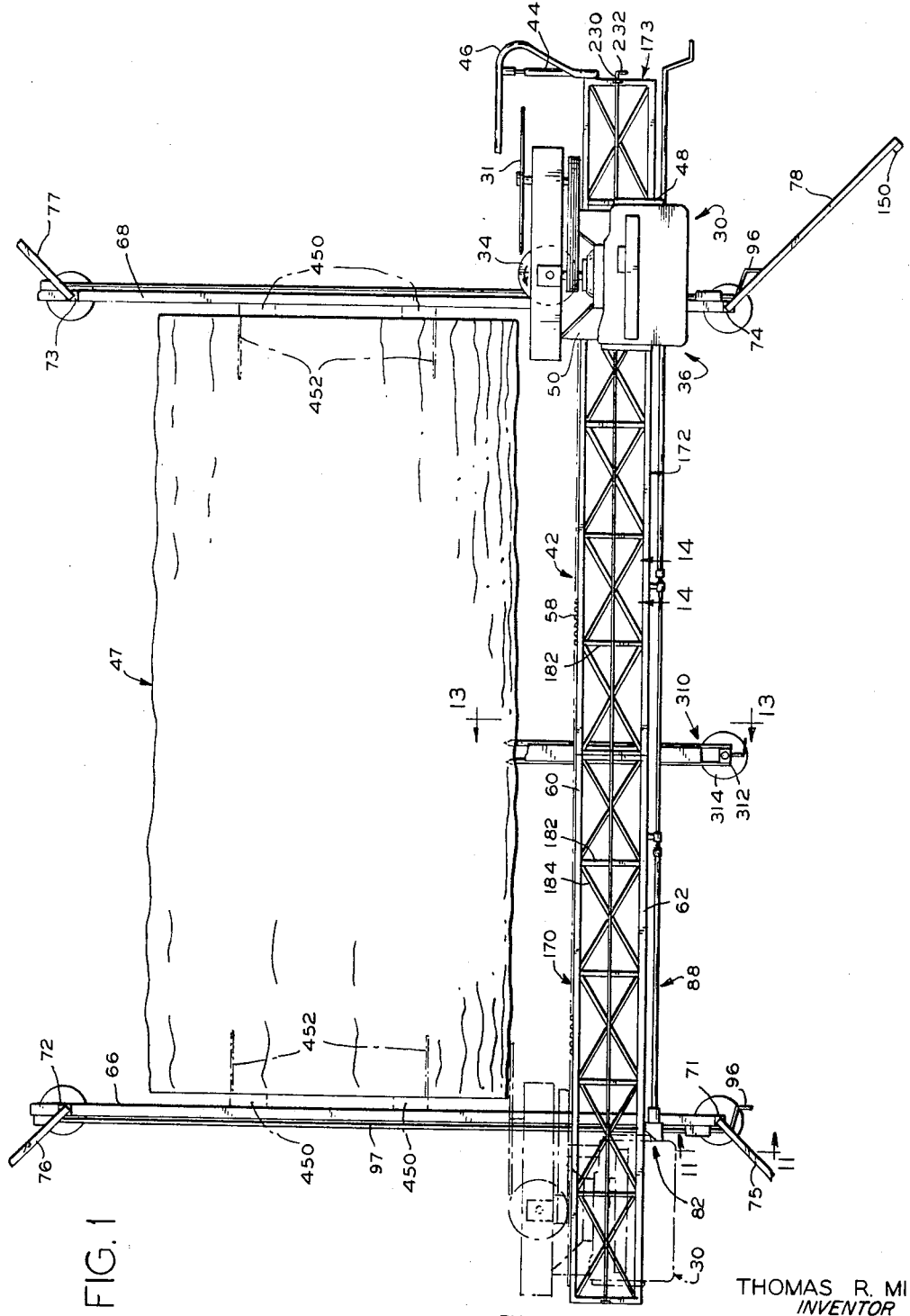
FIG. 1 is a top plan view of a portable sawmill forming one embodiment of the invention.

Referring now in detail to the drawings, a portable sawmill forming one embodiment of the invention includes a saw unit 30 (FIGS. 3 and 4) having a vertical saw 31 and a fixed, horizontal, lower saw 32 and an adjustable, horizontal, upper saw 34 driven by a prime mover in the form of a gasoline engine drive 36 in the disclosed embodiment and carried with the drive 36 by a carriage 38 movable by a longitudinal feed 40 along a trussed, sectional track 42. The offbear end of the track carries an offbear roller 44 and a cage-like guard 46. The saw unit 30 makes a vertical cut and one or more horizontal cuts in a suitably chocked log 47 (FIGS. 1 and 2) to form one or more boards or cants. The carriage 38 is sectional and has a main frame 48 and an attachment or saw carriage frame 50, which carries the saws and the longitudinal feed 40. The carriage carries a ratchet type or one-way offbear pusher arm 52 (FIGS. 4 and 6) which pushes the sawed board onto and past the roller 44. The carriage is moved by a pinion 54 driven by a hydraulic motor 56 along a rack 58, a guide bar 60 and a stabilizing rail 62 of the track. The track is carried by inverted channels 64 slidable along crossfeed rails or tracks 66 and 68 carried by pairs of end stands 71, 72, 73 and 74 steadied by inclined corner braces 75, 76, 77 and 78. Manually actuated drives 80 and 82 have pinions 84 meshing with racks 86 of the rails 66 and 68, and are interlocked by an extensible, quick-disconnect shaft assembly 88 (FIG. 1).

Each crossfeed track 66 and 68 is carried by a pair of vertical travel crosshead assemblies or drives 90 slidable on the stands 71 to 74. The assemblies 90 of each pair are interlocked by a quick-disconnect shaft 97 (FIG. 2) connecting worm gear drives 94, one of each pair of which is driven manually by a crank 96. Each drive 94 includes a drive sprocket 98 (FIG. 11) meshing with a chain 100 secured at its ends to top and bottom brackets 102 and 104 secured to the tops of the stands 71 to 74 and to wide bases or feet 106 detachably locked by pins 108 to the stands, the pins extending through the stands and post portions 109 fixed to the bases 106. Idler sprockets 110 and 112 are carried by frames 114 carrying the worm gear drives 94. The frames 114 are rigid with tubular slides 116 slidable vertically on the stands 71 to 74. When each crank 96 is rotated, the pair of drives 90 travels along the chains 100 supporting that crosshead rail 66 or 68 to adjust the rail vertically on the stands. A manually operable lever 118 serves to lock each of the slides 116 to its stand after adjustment. Scales 120 mounted on collars 122 secured by set screws 124 in adjusted positions on the stands adjacent the cranks 96 overlie top edges 126 of the slides to indicate the vertical positions of the slides on the stands. The scales are marked to compensate for one or two horizontal kerfs.

Each stand 71 to 74 carries at the top end thereof a bracket 130 (FIG. 11) to which is clamped by a clamping plate 132, a bolt 136 and a nut 138 (not shown) one of the braces 75 to 78. The plate 132 and the bracket clamp against edges 142 and 144 of inwardly rolled narrow flanges 146 of the brace, which includes a base or web 148 connecting the flanges, the brace being generally in the form of an inverted U in transverse cross-section. The lower end portion of each brace 75 to 78 is rigidly secured to a stake 150 which is similarly releasably connected to the brace by a clamping plate 152, a bolt 154, a nut 156 and a bracket 158 rigidly connected to the stake.

The track 42 (FIGS. 1, 4 and 7), for shorter logs 46 comprises two standard length sections 170 and 172 and a short, offbear end section 173 longer than carriage 36. For longer logs, intermediate, similar, trussed track sections (not shown) are positioned between the sections 170 and 172 and dowelled and bolted at their ends of the sections 170 and 172. The sections 170, 172 and 173 include longitudinal angle members 174 and 176 at the upper corners and longitudinal angle members 178 and 180 (FIG. 2) at the lower corners. The angle members are welded to the corner portions of stamped, cup-like or flanged metal plates or cross frames 182, and braces or struts 184 are welded to the flanges of the cross frames to make the sections rigid. The adjacent ends of the track sections are secured detachably together by abutting, end crossframes 182 of the sections, the crossframes being bolted together in face-to-face positions.

Rack sections 186 and guide bar sections 188 coextensive with the angle members 174 are secured rigidly to the angle members 174 by bolts 190 and nuts 192. Shims 194 are provided, where necessary, to make the rack sections and the guide bar sections preferably straight. Each rack sections starts and ends with a full tooth, and the ends of the rack sections abut each other. This is effected by making each rack section slightly shorter than desired with all the teeth thereon, and then stretching the rack section a short distance to make it exactly the desired length. Stabilizing guide plate sections 196 coextensive with angle member sections 176 are rigidly mounted on the sections 176 by bolts 198 and nuts 200. Rollers 202 having flanges 204 are mounted rotatably by pairs of bearing members 206 and 208 adjustable in vertical slots in angular brackets 210 and 212 fixed to the frame 48. Adjustment screws 214 and 216 threaded through tapped bores in the upper flanges of the brackets 210 and 212 abut the bearing members 206 and 208 to adjust the rollers 202 to the desired heights. Central portions 215 of the rollers 202 rest on the top of the bar 60 to support the main frame 48, and the flanges 204 bracket the bar 60 to prevent movement of the frame 48 transversely of the bar 60. The other side of the main frame 48 is supported by the stabilizer plate 62 through rollers 220 carried by bracket 222 fixed to the frame 48. Lower rollers 224 carried by the bracket 222 rotate on the underside of the stabilizer plate. Shims 226 are provided to make the stabilizer plate sections 196 very straight and parallel to the guide bar 60. Adjacent ends of the sections 188 are dowelled together by a length of keystock secured to one section 188 and a keyway in the other section. The center of gravity of the carriage 38 and the components carried thereby is between the roller 202 and the roller 220 but nearer the roller 202 than the roller 220, and the roller 224 prevents any swinging of the carriage 38 counterclockwise, as viewed in FIG. 7. This construction also would permit even heavier outboard components than those shown which include the saws 30, 32 and 34, the drive 40 and the other outboard structure and would permit the center of gravity of the carriage 38 and components supported thereby to be even to the left of the roller 202.

To control the feed of carriage 38, there is an eccentric actuator having a hollow telescopic shaft 230 (FIGS. 1, 3, 8 and 9) including an actuating handle 232 at its offbear end and mounted rotatably on the central portions of the tops of the cross frames 182 by conduit hangers 234 bolted to the cross frames. The shaft is in sections having quick-connecting couplings and coextensive with the track sections 170, 172 and 173 and parallel to the track. A tubular actuating rod 236 secured rigidly by spacer rods 238 welded to one side of the shaft 230 is also in coextensive sections, and extends along the upper side of the shaft 230. The rod 236 fits closely between rollers 238 and 240 carried by an actuating slide 242 splined in guides 244 carried by the main frame 48. A bracket 246 fixed to the slide 242 is connected by a connecting rod or link 248 to a lever 250 mounted on fixed pivot 252 carried by attachment frame 50. The level 250 is connected by a link 256 to an actuator 258 of a directional valve 260 secured to a manifold valving block 262 and controlling the operation of hydraulic motor 264 of the longitudinal feed drive 40.

When the rod 236 is in its neutral position in which it is directly above the shaft 230, the slide 242 is in its neutral position and the liquid under pressure from a pump 266 (FIG. 4) supplied by a reservoir 268 bypasses the motor 264. When the rod 236 is swung to its lefthand position shown in dotted lines in FIG. 9, it moves the slide 242 to a feed position in which the valve 260 connects the motor 264 to move the carriage 38 along the track 42 away from the offbear end. When the carriage 38 reaches the other end of the track, at which time a board or cant has been sawed from the log 47, the roller 238 engages a wedge 270 (FIG. 9) carried by the rail 66 and is moved to the right, as viewed in FIG. 8, to move the slide 242 to its neutral position. The operator, who is at the offbear end, then turns the shaft 230 clockwise, as viewed in FIG. 10, to move the slide 242 to the right to cause the motor 264 to be driven in the reverse direction to rapidly return the carriage 38 to its offbear or start position. Just before the carriage reaches its start position, the roller 240 engages a wedge 272 carried by the rail 68 and the wedge 272 moves the slide 242 to its neutral position to shut off the motor 264.

As best shown in FIG. 10, the track 42 is supported by the crossfeed slides 64 between angle seats 280 fixed to plate 282 loosely fixed to spacer 284 by bolts 285 for longitudinal movement of the track. Screws 286 screwed into tapped bores in the plate 282 press clamping plate 288 against the seats 280.

As best shown in FIG. 6, the carriage 38 supports a ratchet or one-way type offbear pusher 300. The pusher 300 includes an arm 302 pivotal on a pin 304 between a normal pushing position toward which it is urged by a spring 306 and a non-feeding position shown in broken lines. A roller 308 on the free end of the arm is positioned to move along side face 310 of the board being cut from the log 47 during the cutting movement of the carriage 38 in which the carriage is moved to the right, as viewed in FIG. 6. After the board has been cut, the roller 308 moves on off the end of the face 310 of the board and the arm 302 is swung by the spring 306 to its full-line position in engagement with a stop 312. Then, on return movement, a pusher face 314 of the arm 302 engages the end of the board and pushes the board onto and past the offbear roller 44. The pin 304 is carried by a bracket 316 fixed rigidly to a vertical tubular member 318 forming a fixed part of the carriage 38. The uppermost part of the offbear roller is slightly higher than the lower saw 32 so as to slightly lift the board from the sawed upper face of the log.

For longer logs, the track 42 (FIG. 1) is lengthened to be quite long by including one or more track sections between the two sections 170 and 172 and some slight sagging of the track would occur. An auxiliary crossfeed track support 310 (FIGS. 1 and 13) then is used to support the central section of the track to prevent any sag. The support 310 includes a tubular standard 312 supported by a shoe 314. A vertical slide 316 having a clamp operated by a set screw 318 is slidable on the stand and supports one end of a tubular rod 320. A pointed rod or dog 322 carried by the rod 320 is driven into the log 47 to support the adjacent end of the rod 320. A crossfeed member 324 supported by collars 326 slidable on the rod 320 and vertically adjustable for level by set screws 328 supports the central portion of the track 42, a sled-like shoe 330 being fixed to the track 42 being slidable on the slide 324 and having an inclined, sled-like end portion 332 adapted to slide easily on the member 324 and on horizontal, sawed face 334 of the log when the track 42 is moved to the right, as viewed in FIG. 13, after board or slab 336 and some other boards have been sawed from the top of the log. The support 310 prevents sag in starting to saw boards from the lefthand edge of the log, and, of course, is adjusted vertically each time a new horizontal top layer of the log is being started to be sawed.

A gauge 340 (FIG. 3) carries a manually operable clamping set screw 342 adapted to engage the rack 86. The set screw is screwed into a U-shaped slide portion 344. A shank 346 has calibrated marks on the top and a hook which is hooked behind and under a hook 348 fixed to the track 42 and indicating on the shank the crossfeed position. Each time a board is being sawed, the operator releases the gauge 340, slides it to the right the distance required for the thickness of the next board plus the kerf width, and then reclamps the gauge to the rack. Then, after the carriage 38 has been returned to its start position at the offbear end and the saws clear the log, the crossfeed drives 80 and 82 are actuated to move the track and the carriage 46 to the right, as viewed in FIG. 3, until the hook 348 engages the hook of the shank 346 to prevent further movement. Now, the saws are ready to cut another board or boards of the desired width and the track 46 is precisely parallel to the previously cut vertical face of the log, all slack in the shaft 88 having been taken up. The worm gear drives 80 and 82 to prevent any creeping movement of the pinions 84 of the drives. A slight amount of lost motion or slack is provided between couplings in the shaft 88, and this is utilized just after a cut has been made to back off the offbear end of the track 42 so that the saw 31 clears the vertical face of the log as the carriage 38 is returned to the offbear end of the track. This slack in the shaft is taken out when the track is moved to the right to position it for cutting the next board or boards.

Figure 4:
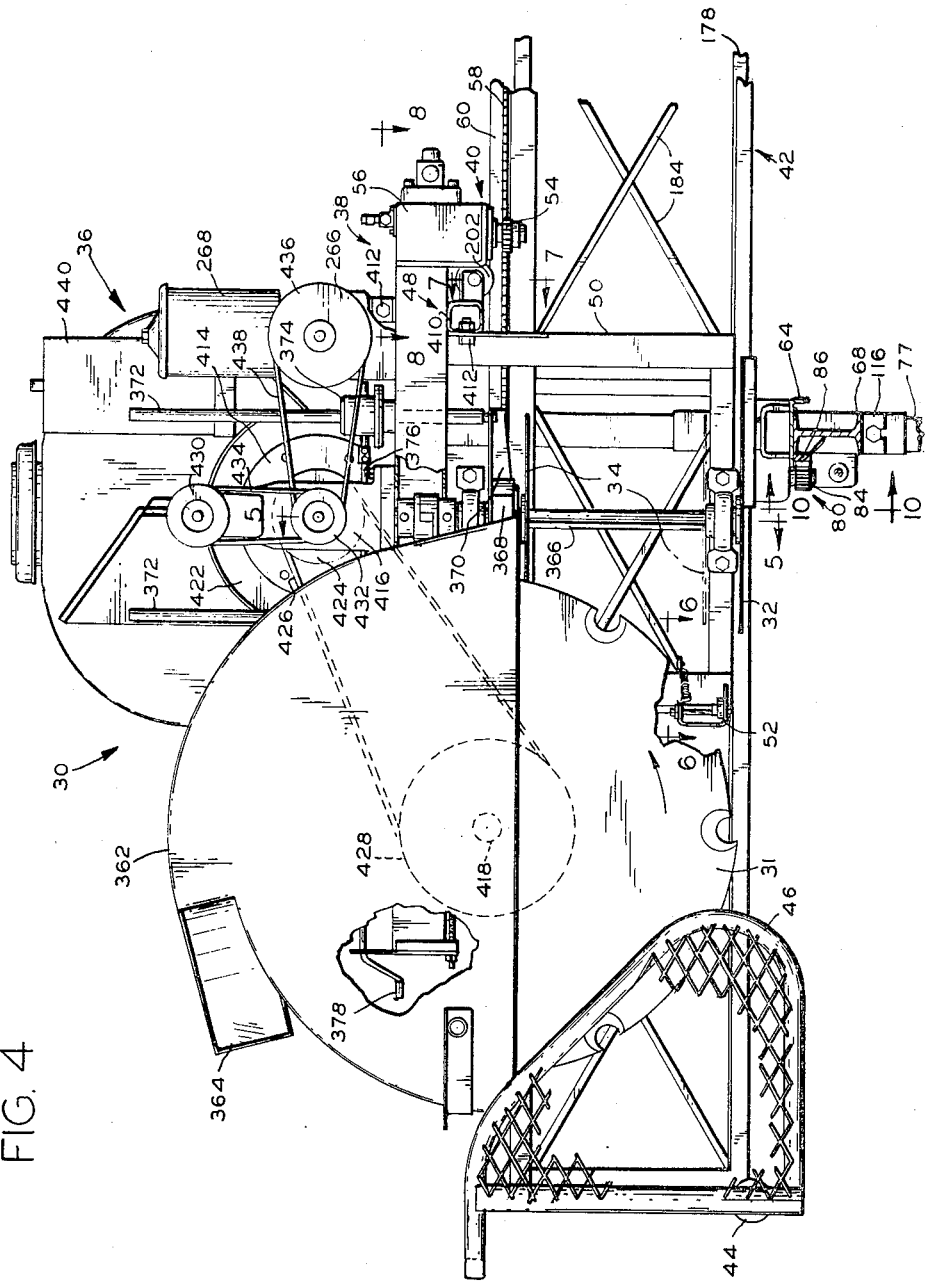
FIG. 4 is an enlarged, fragmentary, side elevation view of the sawmill of FIG. 1.

As best shown in FIGS. 2 and 4, the tangential extremes of the saws 31 and 32 lie in the same line and that of the saw 34 lies in the plane of the saw 31 so that unwanted grooving is avoided. A guard 362 (FIGS. 3 and 4) has a side discharging spout 364 to discharge sawdust to the right, as viewed in FIG. 3. The saw 32 is end mounted at the lower end of arbor 366 with no part of the arbor and the known saw mounting structure projecting below the bottom of the saw 32. The saw 34 is mounted on a collar 368 doubly splined to the arbor 366 and connected to a batwing plate 370 held by widely spaced elevator jacks or guide rods 372 extending through worm gear drives 374 rigidly mounted on the carriage 38. The worm gear drives approach spiral gears so as to be somewhat fast, and are coupled together by a shaft 376 (FIG. 3) having a crank handle 378. The jacks have gear teeth spaced therealong for engagement by the worms in the drives. The drives 374, while providing fast adjustment of the jacks, have a sufficiently high gear ratio that the jacks do not turn the gears but lock the saw 34 in adjusted position. The saw 34 may be positioned in an upper, retracted or inoperative position as shown in full lines in FIG. 4, or many be adjusted to any desired lower, operative position to saw the log to saw, with the saws 31 and 32, two boards in each pass of the carriage, one such position of the saw 34 being shown in broken lines in FIG. 4.

The shafts 97 (FIGS. 1, 2 and 14), while not being extensible over long lengths like the shaft 88, are splined and have quick-connecting couplings 380 (FIG. 14) to connect the pairs of vertical drives 90. Each shaft 97 includes tubes 382 and 384, which have telescopic splining adjacent end portions 386 and 388 and are urged apart by springs 390 bearing against slidable collars 392 at the ends of the tubes 384 and set screw held collars 394 on the tubes 382. The other ends of the tubes 382 and 384 have square socket portions 398 (FIG. 11) fitting over square coupling portions 400 of shafts 402 of the drives 90. The shaft 88 (FIG. 1) has a quick-connecting coupling like that of the shafts 97, is extensible and includes two long, square, pipes telescoped one over the other, and lockable by manually releasable set screws against rotation and longitudinal movement.

The carriage 38 includes the main frame 48 (FIGS. 1, 2, 3 and 15) having a generally U-shaped member 410 or square tubular construction. The attachment or saw carriage frame 50 is quickly assembled with or disassembled from the main frame 48, four bolts 412 being the only fasteners. The saw carriage frame rests on outboard portions of the arms of the member 410 and supports the pump 266, the hydraulic motor drive 40, a known flywheel coupling 414 (FIGS. 4 and 15), a right-angle gear box drive 416 driving the arbor 366, an arbor 418 mounting the saw 31 and bearings 420 mounting the arbor 418. The flywheel coupling 414 is detachably attached to the output shaft of the gasoline engine 36, which may be a commercially available, end mounted Volkswagen industrial engine. The engine is mounted on a flanged or cupped, vertical plate or bracket 422 rigidly mounted on the arms of the U-shaped member 410. The engine 36 drives the saw 31 by multigroove pulley 424 driven by the flywheel coupling, belts 426 and multigroove pulley 428 keyed to the shaft 418. The flywheel coupling also drives a governor 429 by pulleys 430 and 432 and belt 434, drives the right angle gear box drive 416, and also drives the pump 266 by pulleys 436 and belt 438. A gas can 440 is carried by the engine as the fuel supply.

The flywheel coupling and the several controls may be disconnected and the saw carriage frame 50 unbolted and removed and another frame similar to the saw carriage frame and carrying a chain saw or other equipment to be powered by the engine 36 be attached to the main frame 48 and coupled to the output of the engine. The above-described split frame construction of the carriage 38 permits any desired powered attachment to be mounted on the frame 48 and driven by the engine 36.

The sawmill may be used without direct attachment to the log 46 as is shown in the drawings, or end dogs 450 detachably connected to the crossfeed rails may be used.

The dogs 450 (FIG. 1) may be secured by spikes 452 to the ends of the log. The log is secured in place on the ground by chocks and/by blocking whether the dogs 450 are used or not.

It is to be understood that the above-described arrangements are simply illustrative of the application of the principles of the invention. Numerous other arrangements may be readily devised by those skilled in the art which will embody the principles of the invention and fall within the spirit and scope thereof.

What is claimed is:
1. In a portable sawmill,
a pair of crossfeed rails, a pair of crossfeed slides mounted on the rails, pairs of movable rail-supporting stand means supporting the rails in parallel positions, extensible track means supported by the slides, a power carriage movable along the track means, a prime mover on the carriage, a pair of reversible crossfeed drives for moving the slides along the rails, and extensible shaft means coupling the crossfeed drives.

2. The portable sawmill of claim 1 including gauge means settable on one of the rails for stopping movement of one of the slides along the rail on which it is mounted.

3. The portable sawmill of claim 2 wherein the gauge means includes releasable clamp means slidable along the rail and a hook member having a calibrated shank extending parallel to the rail, the slide having a portion adapted to engage the hook member and be stopped and having a portion adjacent the shank to indicate the position of the slide along the shank.

4. The portable sawmill of claim 1 wherein each pair of rail supporting stand means includes a pair of corner stands, a pair of vertical drives movable along the stands and supporting one of the rails and means coupling the drives together.

5. The portable sawmill of claim 4 wherein the vertical drives are self-locking.

6. The portable sawmill of claim 4 wherein the means coupling the vertical drive comprise a quick-disconnecting shaft.

7. The portable sawmill of claim 4 including a plurality of corner braces bracing the stands.

8. The portable sawmill of claim 7 wherein the corner braces consist of four angularly disposed braces.

9. The portable sawmill of claim 1 wherein the track means comprises four corner, longitudinal, angle members, a plurality of cupped crossframes secured to the angle members at spaced points therealong, crossed braces secured to the crossframes and a guiding member fixed to one of the angle members.

10. The portable sawmill of claim 9 wherein the guiding member is shimmed to said one of the angle members.

11. The portable sawmill of claim 9 including a rack member fixed to said one of the angle members.

12. The portable sawmill of claim 11 including a stabilizing, track member secured to a second one of the angle members, the carriage being provided with grooved rollers riding on the guiding member and a plurality of rollers engaging opposite sides of the stabilizing track member.

13. The portable sawmill of claim 9 wherein the track means includes a plurality of separable sections, each section including sections of the angle members and crossframes at the ends of the angle section adapted to abut each other and be bolted together and dowel means adapted to align the sections.

14. The portable sawmill of claim 1 including saw means mounted on the carriage, a prime mover mounted on the carriage for driving the saw means, and carriage feed means driven by the prime mover for moving the carriage along the track means.

15. The portable sawmill of claim 14 including a cage-like guard at one end of the track means.

16. The portable sawmill of claim 14 including remote control means operable at one end of the track for controlling the carriage feed means.

17. The portable sawmill of claim 16 wherein the remote control means includes a feed actuator carried by the carriage, an eccentric member extending along the track means and movable manually and follower means coupled to the feed actuator and operable by the eccentric member.

18. The portable sawmill of claim 17 wherein the remote control means includes cam means at one end of the track means for moving the follower means to a position stopping movement of the carriage toward said one end of the track means as the carriage arrives at that end.

19. The portable sawmill of claim 17 wherein the remote control means includes a pair of wedges at opposite ends of the track means for shifting the feed actuator to neutral position whenever the carriage arrives at either end of the track means.

20. The portable sawmill of claim 1 including auxiliary crossfeed support means positioned between the crossfeed rails and including a horizontal guide member, means supporting the guide member at one side of a log between the crossfeed rails, and a support member supporting the central portion of the track means and supported by the horizontal guide member.

21. The portable sawmill of claim 20 wherein the support member is a sled-like shoe fixed to the bottom portion of the track means in a position directly below the track means and adapted to slide off the guide member onto a planar, sawed, top surface of the log.

22. The portable sawmill of claim 20 including a stand, a slide vertically adjustable on the stand and supporting one end of the guide member and dog means adapted to engage the side of the log and supporting the other end of the guide member.

23. The portable sawmill of claim 1 including vertical rotary saw means carried by the carriage and driven by the prime mover and horizontal rotary saw means carried by the carriage and driven by the prime mover.

24. The portable saw means of claim 23 including belt drive means coupling the prime mover to the vertical rotary saw means and right angle gear box coupling means coupling the prime mover and the horizontal rotary saw means.

25. The portable sawmill of claim 1 including a hydraulic pump driven by the prime mover, rack means on the track means, pinion means and a hydraulic motor on the carriage and driven by the pump to drive the pinion.

26. The portable sawmill of claim 23 wherein the carriage includes a main frame supporting the motor and a saw carriage frame mounting the saws and detachable from the main frame.

27. The portable sawmill of claim 23 wherein the horizontal saw means comprises an arbor, a lower saw on the end of the arbor, an upper saw splined to the arbor, a saw shifter positioning the lower saw, a pair of parallel rods supporting the saw shifter at opposite sides of the arbor, a pair of self-locking worm gear drives supporting and positioning the rods and means drivingly coupling the worm gear drives.

28. The portable sawmill of claim 1 wherein an offbear roller is supported by the track means at one end thereof.

29. In a portable sawmill, a pair of crossfeed rails, a pair of crossfeed slides mounted on the rails, a pair of movable rail-supporting means supporting the rails, track means supported by the slides, a power carriage movable along the track means, a prime mover on the carriage, a pair of crossfeed drives for moving the slides along the rails, means coupling the crossfeed drives, a hook member having a shank with calibrations thereon and a stop portion at one end of the shank, slide means mounting the hook member slidably on one of the rails with the shank extending therealong, releasable means for locking the slide means to the rail, means on one of the slides for engaging the stop portion to limit travel of the slide, and means on the last-mentioned slide indicating on the shank the position of the slide along the shank,

30. In a portable sawmill,
a crossfeed rail,
a crossfeed slide mounted on the rail,
a pair of vertical crossheads supporting the rail,
a pair of vertical stands supporting the crossheads for vertically adjustment thereon,
a track supported at one end by the slide,
a carriage on the track,
saw means carried by the carriage,
a pair of drives for moving the crossheads along the stands,
means coupling the drives together,
each drive comprising sprocket drive means on the crosshead and a chain engaged by the sprocket drive means and
fastened to the upper and lower portions of the stand.

31. In a portable sawmill including a power carriage and saw means on the carriage, an improved track structure mounting the carriage comprising a plurality of sections each including a plurality of square, cupped, sheet metal crossframes, a plurality of angle members secured to the corner portions of the cross frames, and guide bar means secured to and shimmed to one of the angle members.

32. The portable sawmill of claim 30 including a plurality of rack sections secured to the track sections, each rack section having full end teeth and being stretched to a length coextensive with the track section to which it is secured.

33. In a portable sawmill,
track means,
a power carriage movable along the track means,
a prime mover on the carriage,
feed means driven by the prime mover for moving the carriage along the track,
an elongated eccentric member mounted rotatably on the track means in a position extending along the track means,
an actuator on the carriage for controlling the feed means,
follower means carried by the actuator in engagement with the eccentric member for operating the actuator,
and manually operable means at one end of the track means for turning the eccentric member to operate the actuator.

34. The portable sawmill of claim 33 wherein the actutor is adapted to set the feed means in either feed or neutral conditions,
and wedge means at one end of the track means for moving the actuator to change the setting of the feed means from feed to neutral.

35. In a portable sawmill,
a pair of crossfeed structures,
an elongated trussed track supported at its ends by the crossfeed structures in a position extending along a log to be sawed,
saw means movable along the track,
a sled-like support supporting the central portion of the track,
and crossfeed guide means supporting the sled-like support for movement transversely of the log.

36. The portable sawmill of claim 35 in which the saw means serves to cut boards one after another starting at one side and proceeding across the upper portion of the log to leave a flat top surface,
the sled-like support being adapted to leave the crossfeed guide means and slide onto the flat top surface as the surface is formed.

References Cited

UNITED STATES PATENTS

| | | | |
|---|---|---|---|
| 1,908,713 | 5/1933 | McCarroll | 143—47.1 |
| 2,254,293 | 9/1941 | Kaehlert | 143—47.1 |
| 3,111,146 | 11/1963 | Schnepel | 143—43 X |
| 3,374,813 | 3/1968 | Tillery | 143—38 |

HARRISON L. HINSON, Primary Examiner

PO-1050
(5/69)

UNITED STATES PATENT OFFICE
CERTIFICATE OF CORRECTION

Patent No. 3,504,715          Dated April 7, 1970

Inventor(s) Thomas R. Miles

It is certified that error appears in the above-identified patent and that said Letters Patent are hereby corrected as shown below:

Column 2, line 41, change "intensionally" to -- intentionally --
Column 2, line 60, change "slidelike" to --sledlike --
Column 3, line 59, change "adjustably" to --adjustable --
Column 3, line 66, change "slide-like" to --sledlike --
Column 5, line 28, add after "ends" -- to the ends --
Column 7, line 49, after "82" delete "to"
Column 8, line 5, change "many" to -- may --
Column 8, line 28, change "or", first occurrence, to -- of --
Column 8, line 65, change "and/by" to -- and/or --

SIGNED AND
SEALED
AUG 25 1970

(SEAL)
Attest:

Edward M. Fletcher, Jr.
Attesting Officer

WILLIAM E. SCHUYLER, JR.
Commissioner of Patents